(12) United States Patent
Paya et al.

(10) Patent No.: US 7,788,484 B2
(45) Date of Patent: Aug. 31, 2010

(54) USING HIERARCHICAL IDENTITY BASED CRYPTOGRAPHY FOR AUTHENTICATING OUTBOUND MAIL

(75) Inventors: Cem Paya, Seattle, WA (US); Josh D. Benaloh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 11/291,946

(22) Filed: Nov. 30, 2005

(65) Prior Publication Data

US 2007/0124578 A1    May 31, 2007

(51) Int. Cl.
*H04L 29/06* (2006.01)
(52) U.S. Cl. .................... 713/156; 380/277
(58) Field of Classification Search ......... 713/156–157, 713/170, 171, 176, 177; 380/277–286, 44–47, 380/30, 59
See application file for complete search history.

(56) References Cited

U.S. PATENT DOCUMENTS

| | | | | |
|---|---|---|---|---|
| 6,389,136 B1 * | 5/2002 | Young et al. | .................. | 380/28 |
| 7,013,389 B1 * | 3/2006 | Srivastava et al. | ........... | 713/163 |
| 7,123,722 B2 * | 10/2006 | Filipi-Martin et al. | ....... | 380/279 |
| 7,260,716 B1 * | 8/2007 | Srivastava | ................... | 713/163 |
| 7,320,073 B2 * | 1/2008 | Zissimopoulos et al. | .... | 713/179 |
| 7,434,046 B1 * | 10/2008 | Srivastava | ................... | 713/163 |
| 7,516,321 B2 * | 4/2009 | Chen et al. | .................. | 713/155 |
| 7,516,482 B2 * | 4/2009 | Wheeler | ....................... | 726/4 |
| 7,555,757 B2 * | 6/2009 | Smith et al. | ................. | 719/328 |
| 7,627,617 B2 * | 12/2009 | Kavuri et al. | ..................... | 1/1 |
| 7,650,494 B2 * | 1/2010 | Chen et al. | .................. | 713/155 |
| 7,660,983 B1 * | 2/2010 | Srivastava et al. | .......... | 713/163 |
| 7,715,565 B2 * | 5/2010 | Kimmel et al. | ............ | 380/281 |
| 2003/0053630 A1 * | 3/2003 | Elliott et al. | ................ | 380/277 |
| 2003/0093666 A1 * | 5/2003 | Millen et al. | ............... | 713/157 |

(Continued)

OTHER PUBLICATIONS

Horwitz et al, Toward Hierarchical Identity-Based Encryption, Springer-verlag Derlin Heidelberg 2002, pp. 466-481.*

(Continued)

*Primary Examiner*—Matthew B Smithers
*Assistant Examiner*—Abu Sholeman
(74) *Attorney, Agent, or Firm*—Woodcock Washburn LLP (57) ABSTRACT

A hierarchical identity based cryptographic system ("HIBC") is integrated with the domain name system ("DNS"). A private key is assigned to each of the top level domain name authorities responsible for assigning the top level domain names (e.g., .net, .com, etc.). The private key is generated according to an HIBC system, wherein the corresponding public key is based on the identity of the particular domain authority. When user requests a domain name from one of the top level domain name authorities, the user is issued a private key that is generated by the top level domain authority using its private key and the identity of the user according to the particular HIBC system implemented. The user's corresponding public key can be derived from the identity of the user and the public key of the top level domain name authority. Similarly, when the user adds servers and accounts to the users domain, the user can generate private keys for the servers and accounts using the users private key according to the particular HIBC system. Later, emails originating from the users domain can be authenticated by recipients using the public key associated with the top level domain name authority.

8 Claims, 5 Drawing Sheets

U.S. PATENT DOCUMENTS

| | | | |
|---|---|---|---|
| 2003/0138105 A1* | 7/2003 | Challener et al. | 380/277 |
| 2003/0179885 A1* | 9/2003 | Gentry et al. | 380/277 |
| 2004/0015584 A1* | 1/2004 | Cartmell et al. | 709/225 |
| 2004/0225722 A1* | 11/2004 | Jeong | 709/218 |
| 2005/0010801 A1* | 1/2005 | Spies et al. | 713/200 |
| 2005/0039019 A1* | 2/2005 | Delany | 713/176 |
| 2005/0058294 A1* | 3/2005 | Chen et al. | 380/277 |
| 2005/0246539 A1* | 11/2005 | Cofta et al. | 713/176 |
| 2005/0262353 A1* | 11/2005 | Gentry et al. | 713/176 |
| 2007/0005702 A1* | 1/2007 | Tokuda et al. | 709/206 |
| 2007/0006322 A1* | 1/2007 | Karimzadeh et al. | 726/27 |
| 2007/0022292 A1* | 1/2007 | Thayer et al. | 713/176 |

OTHER PUBLICATIONS

Craig Gentry and Alice Silverberg, Hierarchical ID-based cryptography, 2002, Asiacrypt 2002, LNCs 2501, pp. 548-566.*
Jeremay Horwitz and Ben Lynn, Toward Hierarchical identity based encryption, 2002, Eurocrypt, 2002, LNCS 2332, pp. 466-481,2002.*

* cited by examiner

USING HIERARCHICAL IDENTITY BASED CRYPTOGRAPHY FOR AUTHENTICATING OUTBOUND MAIL

BACKGROUND

Spam, or unwanted e-mail, once a tolerable inconvenience to internet users, has turned into an epidemic in recent years. Senders of spam often used forged email addresses and accounts to disguise where they are sending the email from, making it impossible to simply block particular email addresses or ISPs. While spam filters can be of some help in reducing the quantity of the unwanted email, they are, at best, an incomplete solution.

One solution to this problem is the use of public key cryptography, in particular, digital signatures. In this scenario, each ISP would attach a digital signature to all outgoing email. The digital signature is a value produced as a function of the message to be signed together with the ISP's private key. Each ISP has an associated private key and a public key. The ISP keeps its private key secret, but it can make its public key freely available.

When an ISP of the recipient of the email receives an email from the ISP of the sender, the receiving ISP retrieves the public key of the sending ISP and attempts to verify the digital signature of the email using the public key. If the digital signature is successfully verified, then the receiving ISP can assume that the email was in fact sent by the ISP of the sender. Further, the receiving ISP may compare the name of the sending ISP against some type of reputation list. If the sending ISP is associated with sources of SPAM, then the email may be denied. Otherwise, ISP may forward the email to the recipient. This method prevents spammers from forging the origins of their emails, because they do not know the private key of legitimate ISPs, as well as provides accountability for ISPs that continue to send spam, since we can presumably add those ISPs to the reputation list.

However, such a system still relies on the availability of the public keys for ISPs. A spammer could tamper with the ISP list, even temporarily, and substitute a legitimate public key with one associated with the spammers private key. This method would allow a spammer to send messages, with valid signatures, purporting to be from the ISP. These messages would be successfully authenticated using the forged public key, and delivered to users.

SUMMARY

A hierarchical identity based cryptographic system ("HIBC") is integrated with the domain name system ("DNS"). A private key is assigned to each of the top level domain name authorities responsible for assigning the top level domain names (e.g., .net, .com, etc.). The private key is generated according to an HIBC system, wherein the corresponding public key is based on the identity of the particular domain authority. When user requests a domain name from one of the top level domain name authorities, the user is issued a private key that is generated by the top level domain authority using its private key and the identity of the user according to the particular HIBC system implemented. The user's corresponding public key can be derived from the user's domain name and the public key of the top level domain name authority. Similarly, when the user adds server and accounts to the users domain, the user can generate private keys for the servers and accounts using the users private key according to the particular HIBC system. Later, emails originating from the users domain can be authenticated by recipients using the public key associated with the top level domain name authority.

DETAILED DESCRIPTION

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Figure 1:
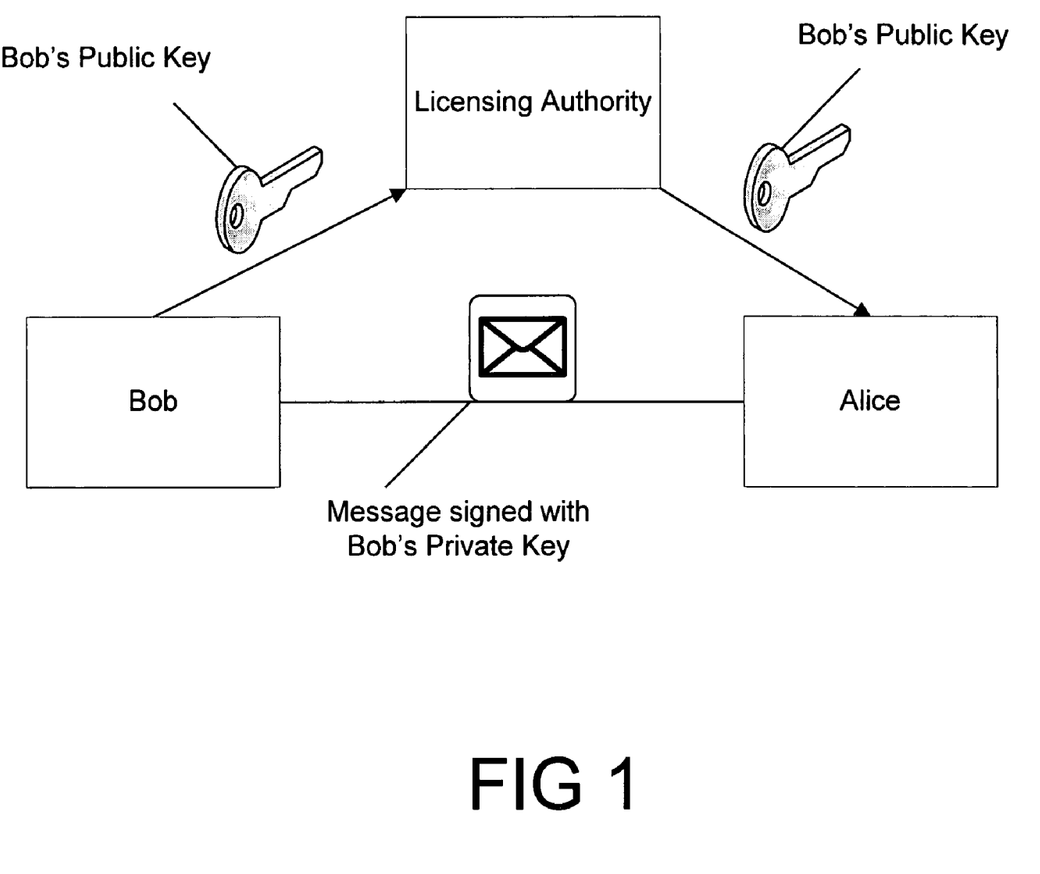
FIG. 1 is a diagram illustrating a prior art system for message authentication.

FIG. 1 is an exemplary illustration of a prior art system for email authentication using public key cryptography. As shown, a user Bob may wish to send an email to a user Alice. However, because of privacy or security reasons both Bob and Alice may desire to be able to authenticate, or prove, that the particular email actually came from Bob. Accordingly, Bob may digitally sign his email using public key cryptography.

In traditional public key cryptography, Bob would generate two keys: a public key, and a private key. The keys are related such that any message encrypted by the public key can only be decrypted by the private key, and any message that is verified with the public key must have been signed with the private key.

Bob keeps the private key in a secure place, but makes the public key available. Then when Bob desires to send an email to Alice, Bob can sign the message with his private key and attach the resulting digital signature to the email. When Alice receives the email she can retrieve Bob's public key and use it to verify the digital signature. If the verification is successful, Alice can be reasonably assured that Bob sent the email because only Bob knows his private key.

However, there are key distribution problems associated with authenticating using the public key cryptography. These problems are generally associated with how one user obtains the public key of another. First, many users are not sophisticated enough to retrieve a public key from a licensing authority when they receive a digitally signed email. Second, even if they were, there is no one central licensing authority available to deposit keys. Third, a malicious user could both send the email and pose as the licensing authority, thus allowing the malicious user appear to be anyone they wish.

Figure 2:
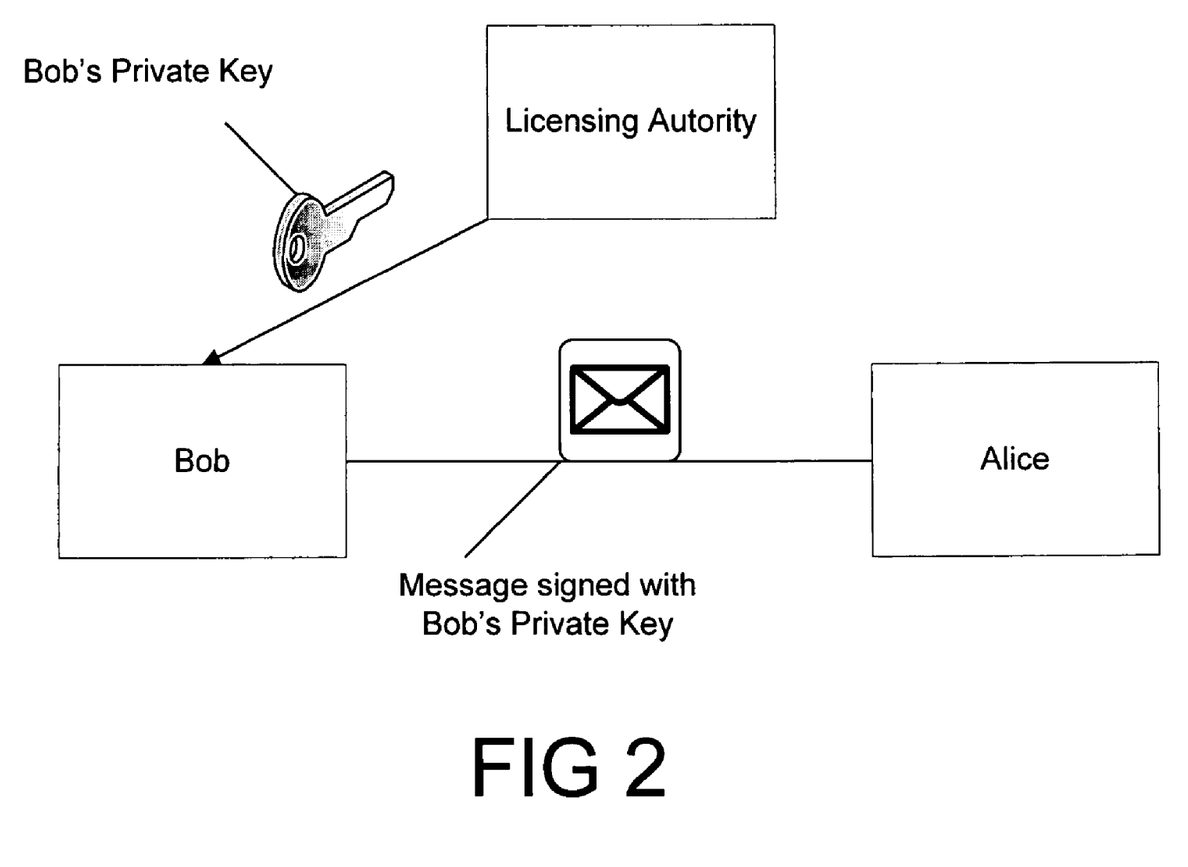
FIG. 2 is a diagram illustrating a prior art system for message authentication.

FIG. 2 illustrates another prior art solution to email authentication. This solution uses identity based cryptography. Identity based cryptography replaces the need for the receiving party to contact a centralized licensing authority by utilizing the name of a party as their public key. For example, in FIG. 2 the user Bob's public key would be Bob, and the user Alice's public key would be Alice.

However, unlike in the previous example, the user's corresponding private key is generated by a central authority based on the user's public key, i.e., name. Accordingly, when a user such as Bob sends an authenticated email to Alice, Bob first digitally signs the email using the received private key. Alice can then authenticate the email simply using Bob's name as the public key. As a result there is no need for Alice to obtain Bob's public key from another source.

However, as described above, in identity based cryptography systems the users' private key is generated by a licensing authority. Because the licensing authority is required to generate private keys for all users in the system, significant overhead may be required to maintain the system. In addition, because users are required to have the authority generate the corresponding private key, many users may not take the time to do so resulting in a less than fully supported solution.

These problems can be solved by integrating a hierarchical based identity cryptography (HIBC) system with the domain naming system ("DNS"). In a HIBC system, a central authority is created to generate private keys for entities using their names as public keys. However, these entities are further able to generate private keys for other entities using the private key provided to them by the central authority. Similarly, these entities are further able to generate private keys for other entities using their provided private keys. The public keys of any entity may then be derived using the public key of the entity that granted that entity its public key. Thus, the public key of any entity can be derived from the public key of the entity at the top of the private key granting hierarchy. This HIBC system reduces the responsibilities of the central authority by allowing other entities to act as central authorities with respect to all users below them. Because of the hierarchical nature of the domain naming system, an HIBC system can be easily integrated allowing private keys to be issued at the time of domain name registration. Entities belonging to a particular domain may then create public keys for entities below them using the provided private key at the time of account creation.

Figure 3:
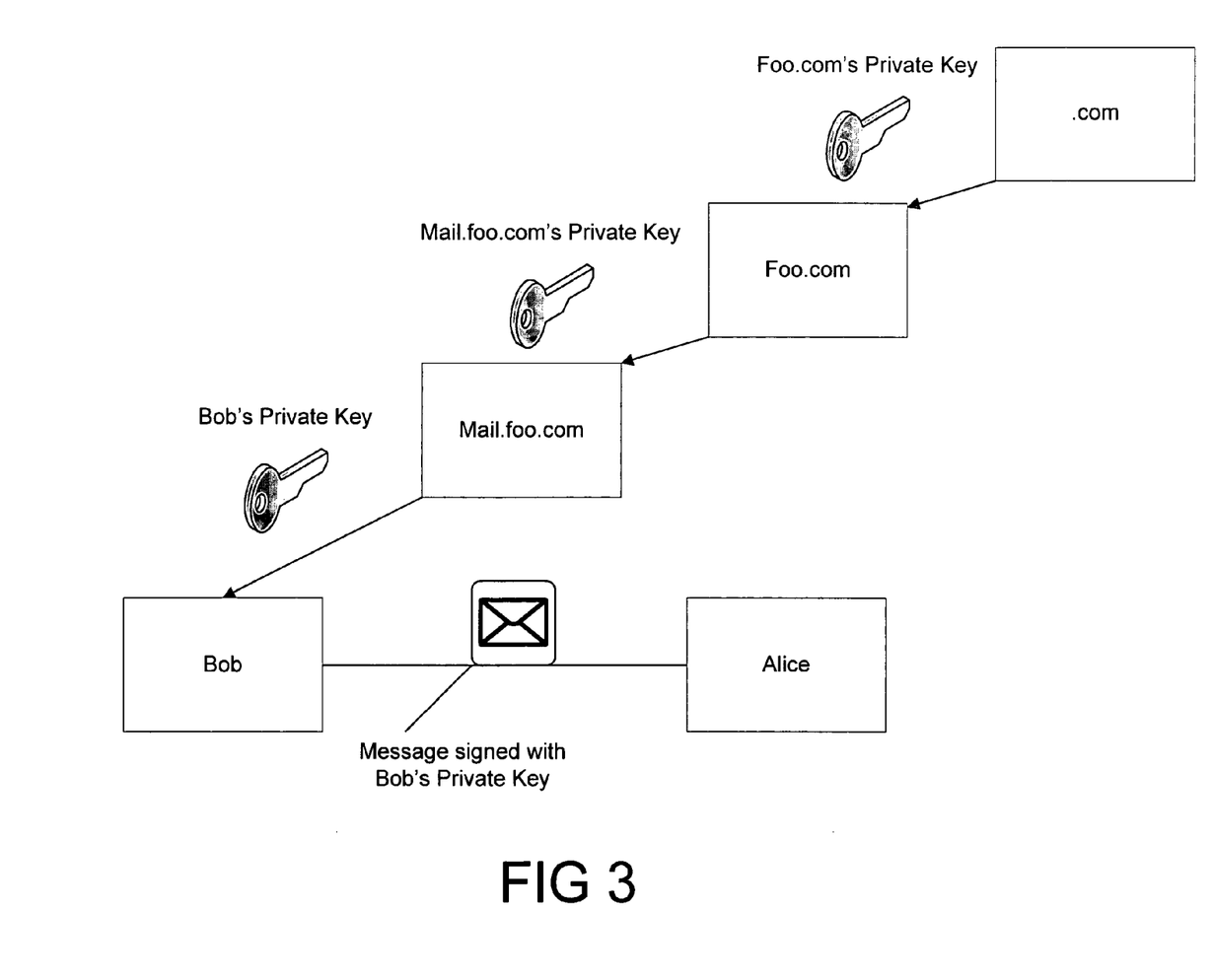
FIG. 3 is a block diagram illustrating an exemplary method for message authentication in accordance with the invention.

FIG. 3 is an illustration of an HIBC system integrated with the DNS in accordance with the invention. At the top of the DNS are authorities responsible for assigning domain names for each of the recognized top level domain names or suffixes. These may include .com, .gov, .net, .org, .edu, .mil, .biz. .name, etc. These may also include the two letter country code top level domain names associated with many countries. For illustrative purposes only the authority corresponding to the .com suffix is shown in the drawings. However, there is no limit to the number of top level domain name suffixes that may be supported by the invention.

When a user or corporation wishes to create a domain name within a particular domain the user or company typically contacts the corresponding domain name authority, For example, if a user wishes to establish the domain foo.com, the user would contact the authority responsible for the .com domain, in this case the block labeled .com.

In order to integrate the HIBC system into the DNS process, the user responsible for foo.com is desirably issued a private key from the .com authority when the foo.com domain is created. The private key for the foo.com domain is desirably generated using the private key of the .com authority. Any system, method, or technique known in the art for HIBC may be used.

Using the rights granted to foo.com by the DNS authority, the foo.com domain may now grant rights to addresses within the foo.com domain. For example, as shown foo.com may grant rights to an email server named mail.foo.com. At the same or a later time, the foo.com authority may grant a private key to mail.foo.com using the private key provided to it by the .com authority. The private key is desirably generated by foo.com using the same HIBC system used by the .com authority to generate its private key.

Similarly, the mail.foo.com email server may generate private keys for its users. As shown in FIG. 3, a user Bob may have one or more accounts on the server. The server may issue Bob a private key. The server mail.foo.com may generate the private key using the same method for HIBC used by foo.com and its private key.

As illustrated on FIG. 3, Bob may desire to send an authenticated message to Alice. As described above, Bob has desirably been issued a private key by the server mail.foo.com, which was issued its key by the domain foo.com, which was issued its key by the .com authority in conjunction with the DNS process. The private keys are desirably issued using a HIBC system such that each holder of a private key has the ability to issue private keys derived from its own private keys to others. The others in turn are able to use there own private keys to further generate private keys to others below them. Public keys are based on the user identity, and a particular user's public key can be derived from the name of the user and the public key of the user at the top of the key hierarchy.

Continuing the above example, Bob may digitally sign his message to Alice using his private key. When Alice receives the message she may authenticate the message using the public key corresponding to the top of the key hierarchy. In this example, the .com authority holds the private key that was used to generate all successive private keys, thus its public key can be used to derive the public key of user Bob. Because the system uses hierarchical identity based cryptography, the public key of any user or entity can be generated or derived from the name of the entity and the public key of the authority that that granted its public key. While the present example describes email authentication using digital signatures, the invention is not limited to authentication using digital signatures. Any systems, method, or techniques known in the art for authentication in HIBC systems may be used.

As an alternative to the above described example, instead of Bob signing his messages using his public key, Bob's mail server, mail.foo.com, instead signs all outgoing messages with its private key. Accordingly, Alice's mail server (not shown) or Alice may then authenticate that the email was sent by mail.foo.com by deriving mail.foo.com's public key. If authenticated, the email may then be forwarded to Alice for viewing. By authenticating the server, rather than the sender, the system becomes transparent to the users Bob and Alice, thus increasing the likelihood of usage. While the above example does not necessarily authenticate the email as actually being sent by Bob, it does authenticate that the email came from the listed mail server. Because spammers typically forge the server name, as well as the user name, authentication of the server only may be sufficient to identify spam email.

Figure 4:
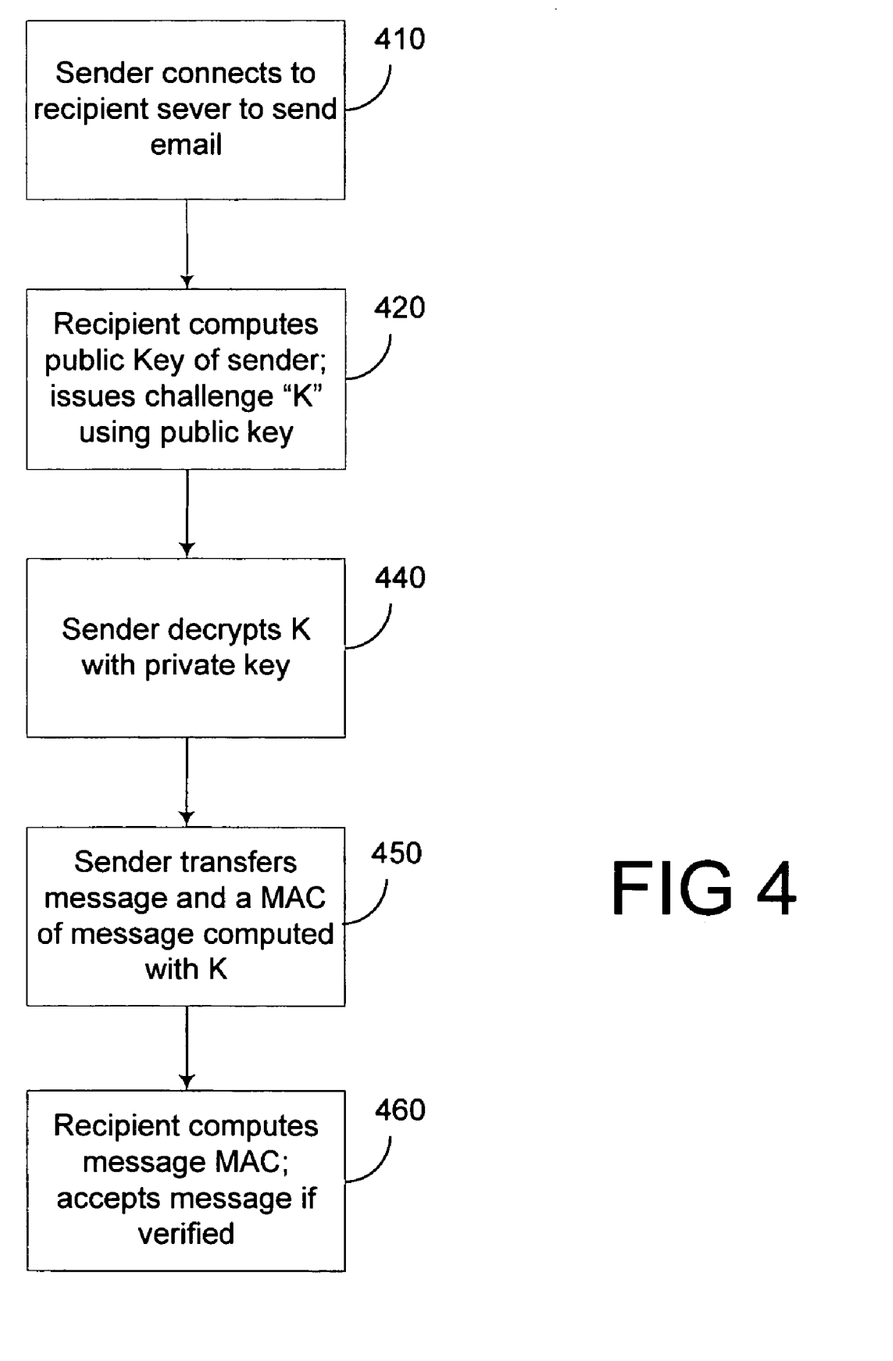
FIG. 4 is a flow diagram of an of an exemplary method of authentication without signatures in a hierarchical identity based cryptography system in accordance with the invention.

FIG. 4 is an illustration of an of an exemplary method of authentication without signatures in a hierarchical identity based cryptography system in accordance with the invention. Before sending a message to a recipient, the sending server connects to the recipient server. The recipient server computes the senders public key according to the HIBC system utilized. Using the public key, the recipient server encrypts a challenge K and sends it to the sender server. The sender server decrypts the challenge K and uses it, along with the proposed message, to generate a message authentication code. The sender sends the message and the message authentication code to the recipient server. If the recipient server computers an equivalent message authentication code using the challenge K and the message body, then the sender server is authenticated. The length of time or number of emails allowed before a particular sender server must be re-authenticated can be set depending on the particular security requirements of the recipient server.

At 410, a sender ISP or server desirably connects to a recipient ISP or server. The sender server may connect to the recipient server to authenticate a message to be sent from a user at the sender server. As described above, each server is desirably part of a HIBC system and possesses a private key for encryption assigned their respective parent domains. Any system, method, or technique for HIBC may be used.

At 420, the recipient server desirably issues a random challenge K to the sender server encrypted using the sender server's public key. In order to verify that the message that the sender server desires to send originates from the sender server, the recipient server may provide the sending server a challenge K encrypted using the sender server's public key. The sender server's public key may be derived from the name of the sender server using any system, method, or technique known in the art for HIBC.

Because only the sender server possesses the corresponding private key, only if the sender server is who it purports to be will the sender server be able to decrypt the encrypted challenge K. The decrypted challenge K may then be used by the sender server to compute a message authentication code (MAC) using the challenge K, and is sent along with the desired message. If the recipient server is able to compute the same MAC from the received message using the challenge K, then the sender server is successfully authenticated.

The benefit of using the challenge K and the MAC, versus digital signatures, is that computing a MAC from a sent message is much less computationally intensive. Another benefit of using the challenge K and the MAC is that it avoids the non-repudiation aspect of digital signatures. Because a digitally signed message has an attached proof of origin, a sender cannot deny sending the message in the future.

The challenge K may be randomly generated using any system, method, or technique known in the art for generating a cryptographic challenge. The challenge is desirably large enough to make it infeasible for an attacker to attempt to guess it by using all possible values. An 80 bit length string may be sufficient, for example.

Once sent the challenge K is desirably set aside by the recipient server to authenticate received messages from the sender server. A particular challenge K may only remain valid for a predetermined time, or number of emails. Once a challenge K expires the sender server is desirably re-authenticated using a new challenge K.

At 440, the sender server receives the encrypted challenge K from the recipient server. As described previously, the recipient encrypted the challenge K using the public key of the sender server as determined according to the HIBC system. Accordingly, the sender server may decrypt the challenge K using its own private key. The private key was assigned to the sender server from its parent domain according to the HIBC system used.

At 450, the sender server may send the desired message to the recipient server along with a MAC computed using the message and the decrypted challenge K. A MAC is an authentication tag (also called a checksum) derived by applying an authentication scheme, together with a secret key, to a message. Unlike digital signatures, MACs are computed and verified with the same key, so that they can only be verified by the intended recipient.

In this case, the challenge K may be used as the secret key. The proposed message and the challenge K are used to generate the MAC. The resulting MAC may then be attached or appended to the message and the message may be sent to the recipient server. Any system, method, or technique known in the art for authentication may be used to generate the MAC so long as both the recipient server and the sender server are using the same technique.

At 460, the recipient server desirably receives the transmitted message along with the computed MAC. In order to verify that the message was indeed received from the sender server, the recipient server desirably attempts to recalculate the attached MAC from the transferred message using the original challenge K. If the calculated MAC is the same as the MAC transferred by the sender server along with the message, then the sender server is successfully verified as the source of the message. If the MACs are not the same, then the sender server cannot be authenticated as the source of the message.

As described above, a sender server desirably receives the challenge K from the recipient server. For improved efficiency, a particular challenge K may be used to send multiple emails. A negotiated challenge K may remain valid for a particular time period, such as one day for example, or may be used for a negotiated number of emails between the servers. The length of time a particular challenge K remains valid is trade off between security (the longer a challenge is used the greater the chance that it has become known to a malicious third party) and efficiency (the cryptographic hand shaking between the sender and recipient server to establish the challenge K has an associated overhead that is reduced by the number of messages that are sent using a particular challenge K). The optimal lifespan for a given challenge K is desirably determined by an administrator taking into account its particular security and efficiency concerns, for example.

Figure 5:
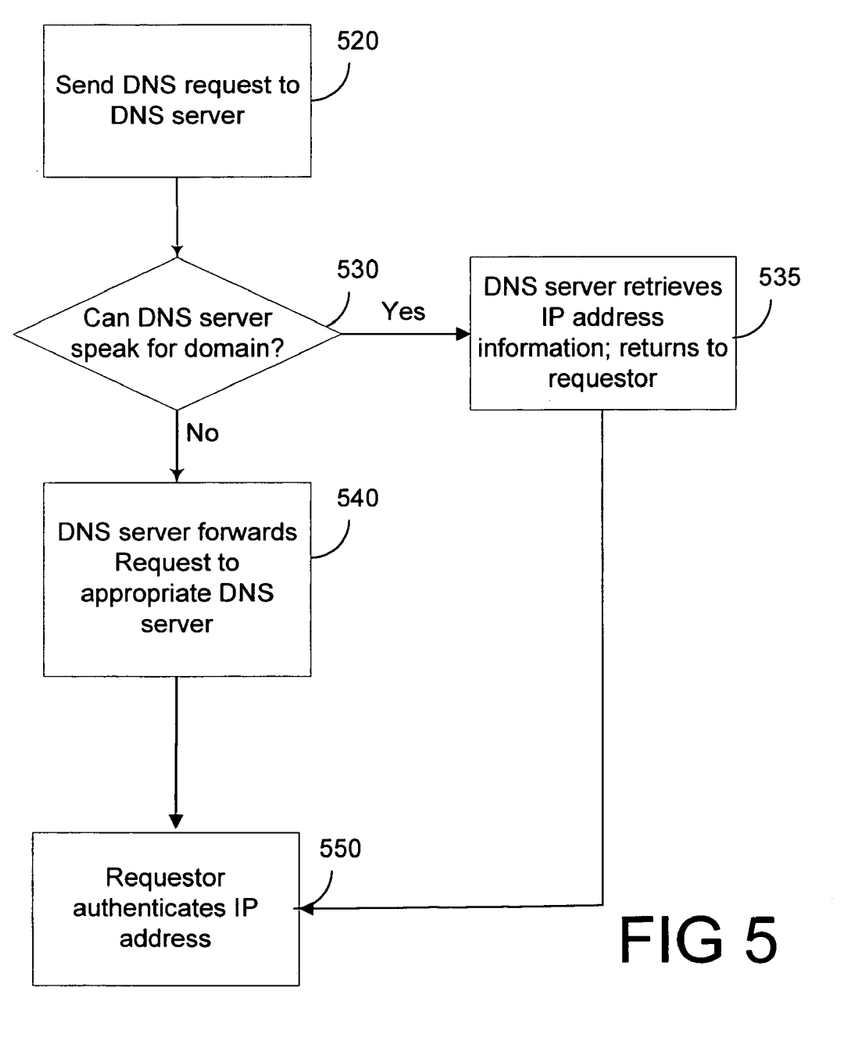
FIG. 5 is flow diagram illustrating an exemplary method for DNS authentication in accordance with the invention.

FIG. 5 illustrates an exemplary method for authenticating domain name server replies in accordance with the present invention. A system for HIBC is created that corresponds to the DNS hierarchy. A DNS request is made to a DNS server. If the DNS server can supply the associated IP address, the DNS server sends the IP address to the requestor. The requester may then authenticate that the IP address came from the DNS server using the particular HIBC system implemented. If the DNS server cannot supply the associated IP address, the DNS server contacts the top level domain associated with the request by moving through the HIBC hierarchy to get an IP address of the domain associated with the IP address. The DNS server may then use this IP address to query the DNS server associated with the domain, who then returns the IP address associated with the original DNS request to the DNS server. The DNS server then sends the IP address to the original requestor. The original requester may then authenticate the IP address using the particular HIBC system implemented.

At 520, a request is made to a DNS server. As described above, DNS servers map domain names to numeric IP addresses. The DNS servers allow users to connect to internet sites using words, rather than difficult to remember numeric strings. The request may comprise a domain name such as mail.foo.com. Any system, method, or technique for making a DNS request may be used.

At 530, the DNS server desirably attempts to retrieve the IP address associated with the requested domain name. If the DNS server can authoritatively speak for the domain associated with the requested domain name then the DNS server desirably returns the associated IP address at 535. IF the DNS server cannot speak for the domain associated with the passed in domain name, then the embodiment may continue at 540.

For example, if a user is located in the domain foo.com, then domain name queries are sent to the DNS server associated with this domain. Because the foo.com domain server can speak for the foo.com domain, the IP address associated with mail.foo.com is returned. However, if the user requesting the IP address of mail.foo.com is a member of the bar.com domain, the request is instead sent to the DNS server associated with bar.com domain, which cannot authoritatively speak for the foo.com domain.

At 535, the DNS server sends the associated IP address to the requester. However, the DNS server first appends a digital signature computed with the private key of the DNS server. The private key was desirably assigned to the DNS server from a parent according to an HIBC system. Any HIBC system known in the art may be used.

While the present example authenticates the IP addresses using digital signatures, it is not meant to limit the invention to authentication through digital signatures. The DNS server desirably takes whatever steps are necessary such that the requestor is able to later authenticate the origin of the IP address. Any system, method or technique for authentication in a HIBC system may be used.

At 540, it has been determined that the DNS contacted by the requestor is unable to speak for the domain associated with the request. Accordingly, the DNS server may send the request to the DNS server associated with the domain of the request. Continuing the example described above, the DNS server associated with the bar.com domain may attempt to contact the DNS server associated with the foo.com domain. The bar.com DNS server may contact the .com server to determine the IP address of the foo.com DNS server. Using the foo.com DNS server IP address, the bar.com DNS server may request the IP address associated with the original IP address request, mail.foo.com, from the foo.com DNS server. Once the bar.com DNS server receives the IP address for mail.foo.com, the IP address may be returned to the requestor. The embodiment may continue at 550.

To improve efficiency, DNS caching may be used by the DNS servers. For example, the bar.com DNS server may store the IP address information received from the foo.com DNS server for future use. Accordingly, if another user in the bar.com domain requests the mail.foo.com IP address, the bar.com DNS server may retrieve the IP from the stored cache. Each cache entry may have an associated expiration date, for example. Any system, method, or technique known in the art for DNS cashing may be used.

At 550, the requester has received the IP address. The IP address desirably corresponds to the initial domain name request sent by the requestor. In order to verify that the IP address was sent by the DNS server, the requestor desirably authenticates the IP address according to the particular HIBC system implemented. In an HIBC system using digital signatures, the public key of the DNS server can be derived from the public key of the authority that granted it it's public key.

Once authenticated, the requestor may use the IP address to locate the desired website. Any system, method, or technique known in the art for HIBC may be used.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for authenticating electronic mail using hierarchical identity-based cryptography, comprising:
   in a hierarchy associated with a domain name service, wherein a first domain resides above a second domain, for the second domain, generating a second public key and second private key pair, wherein the second public key is derived using the domain name service and the second private key is generated using a first private key associated with the first domain;
   for an email server within the second domain, generating a third private key based on the first private key of the first domain;
   for each of a plurality of users, generating a respective public key and private key pair, wherein a respective public key for a user is derived from an associated user name and a respective private key for a user is generated using the third private key;
   receiving an email message from a sender to a recipient, wherein the email message is signed using a corresponding private key of the sender; and
   authenticating the sender using a corresponding public key of the sender, wherein the public key of the sender is derived using the domain name service.

2. The method of claim 1, wherein each public key can be determined using a public key of a top level domain name authority using a hierarchical identity based cryptographic system.

3. The method of claim 2 wherein the top level domain name authority is one com., org, .net, .gov of.edu, .mil, .biz, or .name.

4. The method of claim 2, wherein the top level domain name authority corresponds to a country code top level domain name.

5. The method of claim 1, wherein the sender is associated with the email server, and wherein the corresponding private key of the sender is the third private key.

6. The method of claim 5, wherein the email server is authenticated using a corresponding public key of the email server derived using the domain name service.

7. The method of claim 5, wherein the email server is authenticated by an email server of the recipient.

8. The method of claim 1, wherein the third private key is generated using a hierarchical identity based cryptographic system.

* * * * *